(12) United States Patent
Shakiba et al.

(10) Patent No.: US 8,081,675 B2
(45) Date of Patent: Dec. 20, 2011

(54) DE-EMPHASIZING CABLE EQUALIZER

(75) Inventors: Mohammad Hossein Shakiba, Richmond Hill (CA); Vasilis Papanikolaou, Toronto (CA); David L. Lynch, Burlington (CA)

(73) Assignee: Gennum Corporation (CA)

( * ) Notice: Subject to any disclaimer, the term of this patent is extended or adjusted under 35 U.S.C. 154(b) by 725 days.

(21) Appl. No.: 12/101,291

(22) Filed: Apr. 11, 2008

(65) Prior Publication Data

US 2008/0253439 A1  Oct. 16, 2008

Related U.S. Application Data

(60) Provisional application No. 60/923,213, filed on Apr. 13, 2007.

(51) Int. Cl.
*H03H 7/30* (2006.01)

(52) U.S. Cl. ........ 375/229; 342/151; 375/233; 375/234; 381/103; 386/269; 708/323

(58) Field of Classification Search .................. None
See application file for complete search history.

(56) References Cited

U.S. PATENT DOCUMENTS

| | | | |
|---|---|---|---|
| 4,258,340 A | | 3/1981 | Ryu |
| 5,768,312 A | * | 6/1998 | Imamura ............... 375/228 |
| 5,796,781 A | * | 8/1998 | DeAndrea et al. ........ 375/288 |
| 6,107,896 A | | 8/2000 | Elco et al. |

FOREIGN PATENT DOCUMENTS

| | | | |
|---|---|---|---|
| EP | 1622285 | | 2/2006 |
| JP | 06045873 | * | 2/1994 |
| WO | WO 2004/034078 | | 4/2004 |

OTHER PUBLICATIONS

Maxim, "1Gbps to 12.5Gbps Passive Equalizer for Backplanes and Cables", Maxim Integrated Products, Sunnyvale, California, 2005, 15 pages.
National Semiconductor, "DS80EP100 5 to 12.5 Gbps, Power-Saver Equalizer for Backplanes and Cables", Jul. 2007, 14 pages.
PCT/CA2008/000676 International Search Report dated Jul. 28, 2008, 3 pages.

* cited by examiner

*Primary Examiner* — David C. Payne
*Assistant Examiner* — Adolf Dsouza
(74) *Attorney, Agent, or Firm* — Jones Day

(57) ABSTRACT

In accordance with the teachings described herein, an extended equalizer circuit is provided for equalizing a digital communication signal transmitted over a transmission medium that causes a frequency-dependent attenuation of the digital communication signal. An equalizer may be used that includes a linear equalization circuit and a non-linear equalization circuit, the linear equalization circuit being configured to apply a linear filter to the digital communication signal to compensate for the frequency-dependent attenuation caused by a first portion of the transmission medium, and the non-linear equalization circuit being configured to apply one or more non-linear operations to the digital communication signal. A de-emphasizing equalizer circuit may be coupled in series between the transmission medium and the equalizer and configured to apply an additional linear filter to the digital communication signal in order to compensate for the frequency-dependent attenuation caused by a second portion of the transmission medium.

11 Claims, 4 Drawing Sheets

DE-EMPHASIZING CABLE EQUALIZER

CROSS-REFERENCE TO RELATED APPLICATION

This application claims priority from U.S. Provisional Application No. 60/923,213, filed on Apr. 13, 2007, the entirety of which is incorporated herein by reference.

FIELD

The technology described in this patent document relates generally to video equalizers. More specifically, a de-emphasizing equalizer is provided that is particularly well-suited for use with serial digital interface (SDI) cables.

BACKGROUND AND SUMMARY

Numerous equalizer products are available for use with SDI cables or other transmission media for propagating a digital communication signal. For practical and performance reasons, however, the maximum cable length supported by a typical cable equalizer is limited. Further, because a typical cable equalizer performs both linear and non-linear operations, it is usually not feasible to cascade multiple cable equalizers together in order to support longer cable lengths. It is therefore desirable to provide an equalization circuit that may be extended to support increased cable lengths.

In accordance with the teachings described herein, an extended equalizer circuit is provided for equalizing a digital communication signal transmitted over a transmission medium that causes a frequency-dependent attenuation of the digital communication signal. An equalizer may be used that includes a linear equalization circuit that is configured to apply a linear filter to the digital communication signal to compensate for the frequency-dependent attenuation caused by a first portion of the transmission medium. The equalizer may also include a non-linear equalization circuit that is configured to apply one or more non-linear operations to the digital communication signal. A de-emphasizing equalizer circuit may be coupled in series between the transmission medium and the equalizer and configured to apply an additional linear filter to the digital communication signal in order to compensate for the frequency-dependent attenuation caused by a second portion of the transmission medium.

A method for extending an SDI equalizer to equalize greater cable lengths is also provided. The method may include the steps of configuring the SDI equalizer to compensate for frequency-dependent attenuation in a digital communication signal caused by a first portion of a transmission cable, and coupling a de-emphasizing filter in series between the transmission cable and the SDI equalizer. The SDI equalizer is also configured to apply one or more non-linear operations to the digital communication signal. The de-emphasizing filter is configured to compensate for frequency-dependent attenuation in the digital communication signal caused by a second portion of the transmission cable, but does not perform any non-linear operations to the digital communication signal.

A stand-alone equalizer circuit for use in an SDI link is also provided. A de-emphasizing filter may be used to receive a digital communication signal from a transmission cable and to apply a linear filter to the digital communication signal to compensate for frequency-dependent attenuation in the digital communication signal caused by the transmission cable, where the de-emphasizing filter does not apply any non-linear operations to the digital communication signal. An amplifier may be coupled to the de-emphasizing filter and configured to amplify the digital communication signal to compensate for flat attenuation caused by the de-emphasizing filter and the transmission cable.

DETAILED DESCRIPTION

Figure 1:
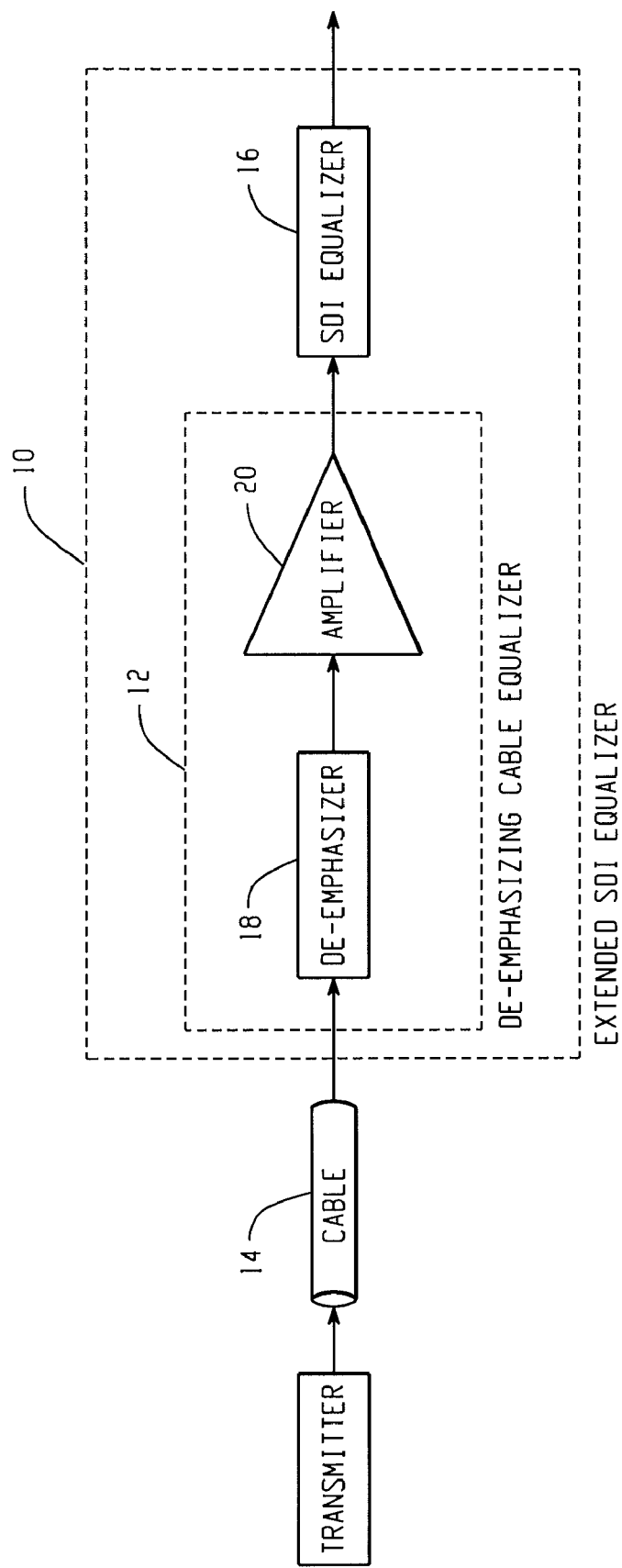
FIG. 1 is a block diagram of an example extended equalizer circuit.

FIG. 1 is a block diagram of an example extended equalizer circuit 10. The extended equalizer 10 includes a de-emphasizing equalizer circuit 12 that is coupled in series between the transmission cable 14 and a cable equalizer 16. The de-emphasizing circuit 12 includes a de-emphasizing filter 18 and an amplifier 20. The cable equalizer 16 is a standard cable equalizer, such as a SMPTE-compliant SDI equalizer.

When a digital communication signal is transmitted over a transmission medium, such as the coaxial cable 14 used in an SDI link, the transmission medium introduces signal dispersion and inter-symbol interference (ISI) by attenuating the high frequency contents of the launched signal. The majority of the high frequency loss is caused by the skin and dielectric effects introduced by the cable 14. In order to compensate for the frequency-dependent attenuation caused by the transmission cable 14, a standard SDI equalizer 16 applies a linear (e.g., high-pass) filter that is designed to match the inverse response for a pre-determined maximum length of cable 14. In addition, a typical cable equalizer 16, such as a SMPTE-compliant SDI equalizer, also performs one or more non-linear operations on the received signal, such as DC-restoration, internal signal slicing, and/or other non-linear operations. These non-linear operations prevent multiple equalizers 16 from being cascaded together to equalize longer cable lengths.

The de-emphasizing equalizer circuit 12 is configured to apply an additional linear (e.g., high-pass) filter to the received signal in order to enable the extended equalizer 10 to support cable lengths above the maximum cable length supported by the standard cable equalizer 16. The de-emphasizing equalizer circuit 12 includes a de-emphasizing filter 18 and a flat-gain amplifier 20. The de-emphasizing filter 18 may be a high-pass filter with a frequency response that is matched to the inverse response of the cable that it is designed to equalize. The bandwidth of the filter 18 can be limited to the minimum bandwidth required, depending on data rate, to prevent excessive noise amplification further down the signal path.

Because the de-emphasizing equalizer circuit 12 does not perform any non-linear operations to the signal, it may be coupled in series before the standard equalizer 16 in order to compensate for the frequency-dependent attenuation caused by the portion of the cable 14 above the maximum length supported by the traditional equalizer 16. For instance, the traditional cable equalizer 16 may be configured to equalize up to 100 meters of cable and the de-emphasizing equalizer circuit 12 may be configured to equalize an additional 20 meters. Further, additional de-emphasizing equalizer circuits (not shown) may be added in series to increase the amount of cable supported by the extended equalizer circuit 10. In this manner, any given length of cable above that supported by the traditional cable equalizer 16 may be equalized by simply adding the appropriate number of de-emphasizing equalizer circuits 12 in series.

The amplifier 20 may be a flat-gain amplifier that is used to amplify the filtered signal to recover any flat attenuation caused by the de-emphasizing filter 18 and the cable 14. As illustrated below in FIG. 3, the de-emphasizing filter 18 may be implemented using passive RLC components. Therefore, because the cable 14 and the de-emphasizing filter 18 are essentially a combination of passive components, there is some amount of flat attenuation (i.e., loss in amplitude) in the signal output from the de-emphasizing filter 18. This flat attenuation is recovered by the flat-gain amplifier 20. It should be understood, however, that the flat attenuation could also be recovered in other ways. For instance, in one alternative embodiment, the amplifier 20 could be omitted and the equalizer 16 could instead be used to compensate for the flat attenuation from the de-emphasizing filter 18. In another example, the flat-gain amplification could instead be performed at the transmit end of the cable 14.

Figure 2:
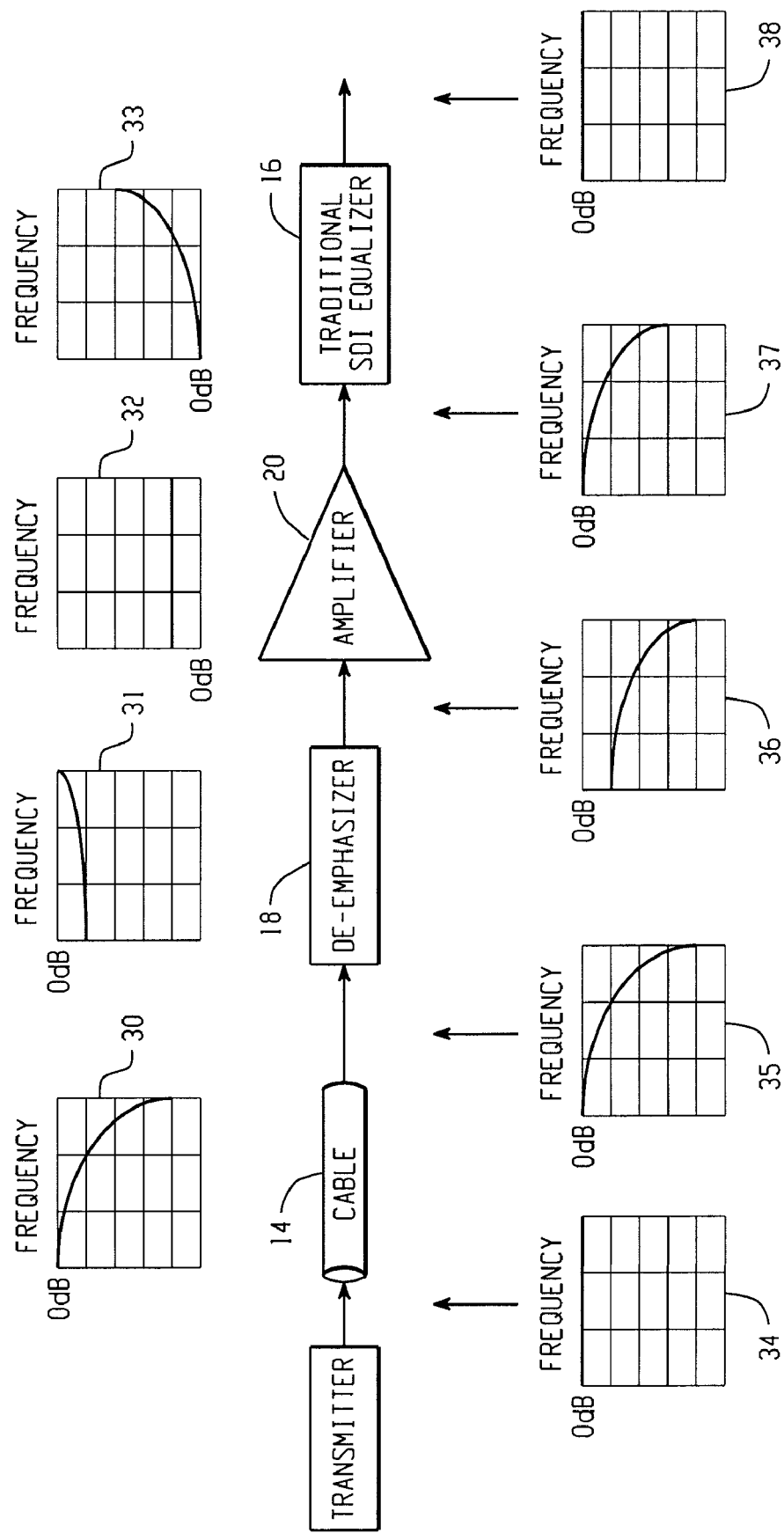
FIG. 2 is a block diagram illustrating example frequency response characteristics for the extended equalizer circuit of FIG. 1.

FIG. 2 is a block diagram illustrating an example operation of the extended equalizer circuit of FIG. 1. In this figure, the frequency domain plots 30-33 at the top of the diagram show example responses for the corresponding circuit components and the frequency domain plots 34-38 at the bottom of the diagram show example system responses at different points in the circuit.

As illustrated by frequency domain plots 30 and 35, the transmission medium 14 acts as a low-pass filter by attenuating the high frequency contents of the launched signal 34. The de-emphasizing filter 18 and the equalizer 16 combine to match the inverse response of the transmission channel as closely as possible to compensate for the high-frequency attenuation caused by the transmission medium 14. As explained above, the equalizer 16 is configured to apply a linear filter with a frequency response 33 that matches the inverse response for a first portion of the transmission medium 14. For instance, the frequency response 33 of the equalizer 16 may be configured to compensate for the high-frequency attenuation caused by a pre-determined maximum length of cable. The de-emphasizing filter 18 is configured to apply an additional linear filter with a frequency response 31 that matches the inverse response for the remaining portion of the transmission medium 14. In this way, the frequency responses 31 and 33 of the de-emphasizing filter 18 and the linear portion of the equalizer 16 combine to provide an overall frequency response for the extended equalizer circuit 10 that matches the inverse response 30 for the entire length of the transmission medium 14.

As shown in FIG. 2, the extended equalizer circuit 10 operates to balance the high frequency and low frequency components so that the overall response throughout the channel and equalizer resembles a flat response 38. This is achieved by matching the frequency responses 31 and 33 of the de-emphasizing filter and the linear portion of the equalizer 16 to the inverse response of the transmission medium 14. In reality, however, an exact match of the frequency responses may not be feasible. Thus, the de-emphasizing filter 18 may be configured to apply a high-pass filter with appropriately located poles and zeros to approximate the ideal target response. The order of this high-pass filter constitutes part of a compromise between many system parameters such as the maximum cable length, noise, residual jitter, bandwidth and required flat gain. In many cases, a first-order filter will be sufficient to provide a considerable boost in cable length, however other filters could also be used. One example is illustrated in FIG. 3, which depicts a circuit diagram of an example de-emphasizing equalizer 12.

Figure 3:
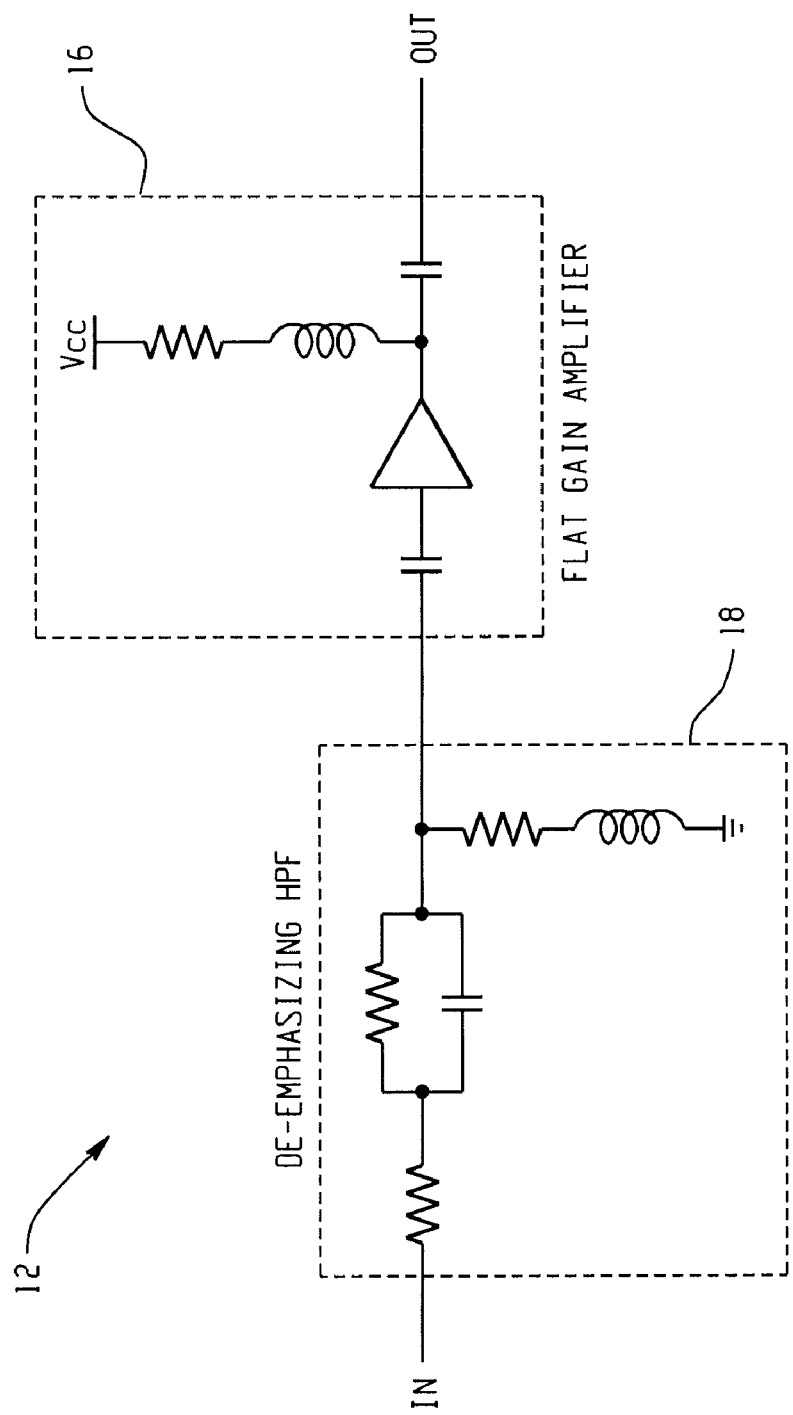
FIG. 3 is a circuit diagram of an example de-emphasizing equalizer.

FIG. 3 includes example circuit diagrams for the de-emphasizing filter 18 and the flat gain amplifier 16. As shown, the de-emphasizing filter 18 may be implemented using a first order high-pass filter. The RLC component values of the de-emphasizing filter 18 may be selected to achieve the desired frequency response and to match the input and output impedances. In addition to system requirements on the input and output impedances, impedance matching may also be beneficial between internal blocks such as the de-emphasizing filter 18, the flat gain amplifier 20 and the equalizer 16, particularly in a discrete implementation of the overall solution.

This written description uses examples to disclose the invention, including the best mode, and also to enable a person skilled in the art to make and use the invention. The patentable scope of the invention may include other examples that occur to those skilled in the art.

Figure 4:
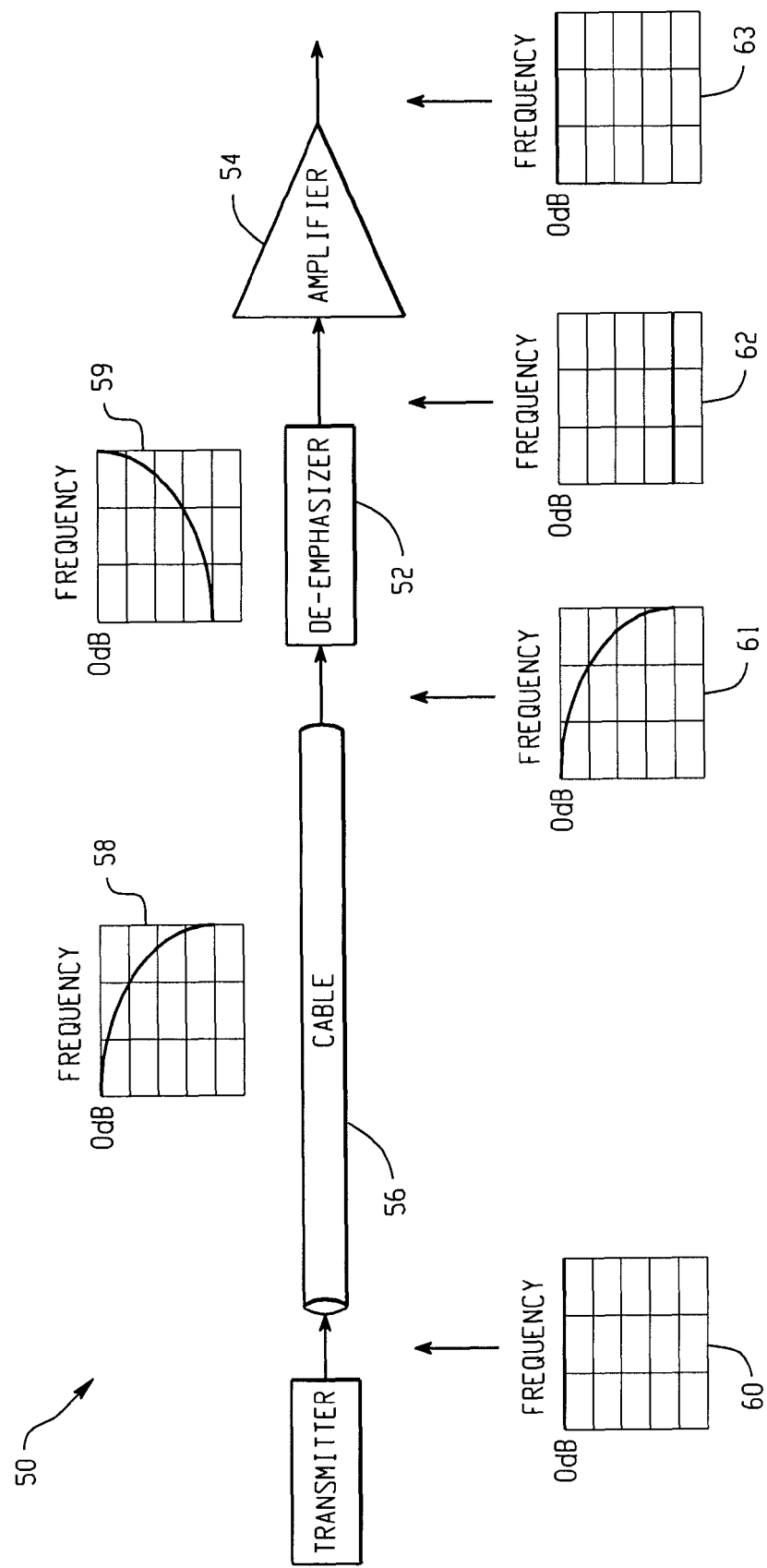
FIG. 4 is a block diagram of an example cable equalizer circuit that utilizes a stand-alone de-emphasizing equalizer.

For instance, FIG. 4 depicts a block diagram of an example cable equalizer circuit 50 that utilizes a stand-alone de-emphasizing equalizer circuit 52, 54. In this example, the de-emphasizing equalizer circuit 52, 54 is used to compensate for the frequency-dependent attenuation in the transmission medium 56 without the benefit of a traditional SDI equalizer. The frequency domain plots 58-63 illustrate an example operation of the stand-alone de-emphasizing equalizer 52, 54, with the plots 58, 59 at the top of the diagram showing example responses for the circuit components and the plots 60-63 at the bottom of the diagram showing example system responses at different points in the circuit.

The de-emphasizing filter 52 in this example is configured with a frequency response 59 that matches the inverse response of the transmission channel 56 as closely as possible. In this example, the de-emphasizing filter 52 is used to compensate for the high-frequency attenuation caused by the entire length of the transmission medium 56. Thus, the output 62 of the de-emphasizing filter 52 resembles a flat response. As shown, the de-emphasizing filter 52 may cause some amount of flat attenuation (i.e., loss of amplitude) in the signal. A flat-gain amplifier 54 may therefore be included to amplify the equalized signal 62 to the desired levels. In the illustrated example, the flat-gain amplifier 54 has been used to amplify the equalized signal 62 to generate an output signal 63 having an amplitude that matches that of the launched signal 60.

It is claimed:

1. An extended equalizer circuit for equalizing a digital communication signal transmitted over a transmission medium, the transmission medium causing a frequency-dependent attenuation of the digital communication signal, comprising:

an equalizer that includes a linear equalization circuit and a non-linear equalization circuit, the linear equalization circuit being configured to apply a linear filter to the digital communication signal to compensate for the frequency-dependent attenuation caused by a first portion of the transmission medium and the non-linear equalization circuit being configured to apply one or more non-linear operations to the digital communication signal, wherein the first portion of the transmission medium includes up to a maximum length that the equalizer is configured to equalize; and a de-emphasizing equalizer circuit coupled in series between the transmission medium and the equalizer, the de-emphasizing equalizer circuit being analog equalizer circuit that is configured to apply an additional linear filter to the digital communication signal in order to compensate for the frequency-dependent attenuation caused by a second portion of the transmission medium, wherein the de-emphasizing equalizer circuit applies no non-linear operations to the digital communication signal, and wherein the second portion of the transmission medium includes a length of the transmission medium beyond the maximum length that the equalizer is configured to equalize.

2. The extended equalizer circuit of claim 1, wherein the linear filter and the additional linear filter are high-pass filters having a combined frequency response that substantially matches an inverse response of the transmission medium.

3. The extended equalizer circuit of claim 2, wherein the additional linear filter is a first order high-pass filter.

4. The extended equalizer circuit of claim 3, wherein the first order high-pass filter is configured to match an input impedance and an output impedance of the de-emphasizing equalizer circuit.

5. The extended equalizer circuit of claim 1, wherein the de-emphasizing equalizer circuit further includes a flat-gain amplifier configured to amplify an output of the additional linear filter.

6. The extended equalizer circuit of claim 1, wherein the transmission medium is a coaxial cable in a serial digital interface (SDI) link and the equalizer is a SMPTE-compliant SDI equalizer.

7. The extended equalizer circuit of claim 1, wherein the one or more non-linear operations include at least one of DC-restoration and internal signal slicing.

8. The extended equalizer circuit of claim 1, further comprising:
  one or more additional de-emphasizing equalizer circuits coupled in series between the transmission medium and the equalizer, the one or more additional de-emphasizing circuits being configured to compensate for frequency-dependent attenuation caused by one or more additional portions of the transmission medium.

9. A method for extending a serial digital interface (SDI) equalizer to equalize greater cable lengths, comprising:
  configuring the SDI equalizer to apply a linear filter to compensate for frequency-dependent attenuation in a digital communication signal caused by a first portion of a transmission cable, wherein the first portion of the transmission cable includes up to a maximum length that the SDI equalizer is configured to equalize, and wherein the SDI equalizer is further configured to apply one or more non-linear operations to the digital communication signal; and
  coupling an analog de-emphasizing filter in series between the transmission cable and the SDI equalizer, the analog de-emphasizing filter being configured apply an additional linear filter to compensate for frequency-dependent attenuation in the digital communication signal caused by a second portion of the transmission cable, wherein the de-emphasizing filter does not perform any non-linear operations to the digital communication signal, and wherein the second portion of the transmission cable includes a length of the transmission cable beyond the maximum length that the equalizer is configured to equalize.

10. The method of claim 9, further comprising:
  coupling a flat-gain amplifier between the de-emphasizing filter and the SDI equalizer to compensate for flat attenuation to the digital communication signal caused by at least the de-emphasizing filter.

11. The method of claim 9, further comprising:
  coupling one or more additional de-emphasizing filters in series between the transmission cable and the SDI equalizer, the one or more additional de-emphasizing filters being configured to compensate for frequency-dependent attenuation in the digital communication signal caused by one or more additional portions of the transmission cable.

* * * * *